(12) United States Patent
Kim et al.

(10) Patent No.: US 7,891,259 B2
(45) Date of Patent: Feb. 22, 2011

(54) HUMAN DUMMY SYSTEM FOR EVALUATING COMFORT OF SEAT

(75) Inventors: Seok Hwan Kim, Gunpo-si (KR); Su Hwan Hwang, Hwaseong-si (KR); Kwang Noh Lee, Ansan-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 15 days.

(21) Appl. No.: 12/331,987

(22) Filed: Dec. 10, 2008

(65) Prior Publication Data
US 2009/0151444 A1 Jun. 18, 2009

(30) Foreign Application Priority Data
Dec. 14, 2007 (KR) .................. 10-2007-0131013

(51) Int. Cl.
*G01M 17/007* (2006.01)
(52) U.S. Cl. .................. 73/862.391; 73/172; 73/866.4
(58) Field of Classification Search .................. 73/172, 73/862.91, 866.4
See application file for complete search history.

(56) References Cited

U.S. PATENT DOCUMENTS

| | | | | |
|---|---|---|---|---|
| 4,669,302 A | * | 6/1987 | Wagner et al. ............... | 73/172 |
| 5,628,230 A | * | 5/1997 | Flam ........................... | 73/172 |
| 6,191,798 B1 | * | 2/2001 | Handelman et al. .......... | 345/473 |
| 6,206,703 B1 | * | 3/2001 | O'Bannon .................... | 434/274 |
| 6,682,351 B1 | * | 1/2004 | Abraham-Fuchs et al. .. | 434/247 |
| 6,982,409 B2 | * | 1/2006 | Huang et al. ................. | 250/221 |
| 7,086,273 B2 | * | 8/2006 | Lipmyer ...................... | 73/12.09 |
| 7,347,114 B2 | * | 3/2008 | Reynolds et al. ............ | 73/866.4 |
| 2008/0188986 A1 | * | 8/2008 | Hoppe ......................... | 700/263 |
| 2009/0025492 A1 | * | 1/2009 | Hwang et al. ............... | 73/866.4 |
| 2009/0056481 A1 | * | 3/2009 | Hwang et al. ............... | 73/866.4 |

FOREIGN PATENT DOCUMENTS

WO WO 2006086021 A2 * 8/2006

* cited by examiner

*Primary Examiner*—Freddie Kirkland, III
(74) *Attorney, Agent, or Firm*—Morgan, Lewis & Bockius LLP

(57) ABSTRACT

A human dummy system for evaluating the comfort of a seat comfort includes sensor units and a data processing unit. The sensor units are attached to the relevant joints of a human dummy, and detect the angles of the relevant joints. The data processing unit calculates information about relative locations of adjacent joints on the basis of the information about the angles of the relevant joints, and calculates the absolute location of a specific joint through coordinate system transformation between the information about relative locations and the joints of the human dummy.

12 Claims, 4 Drawing Sheets

FIG. 4

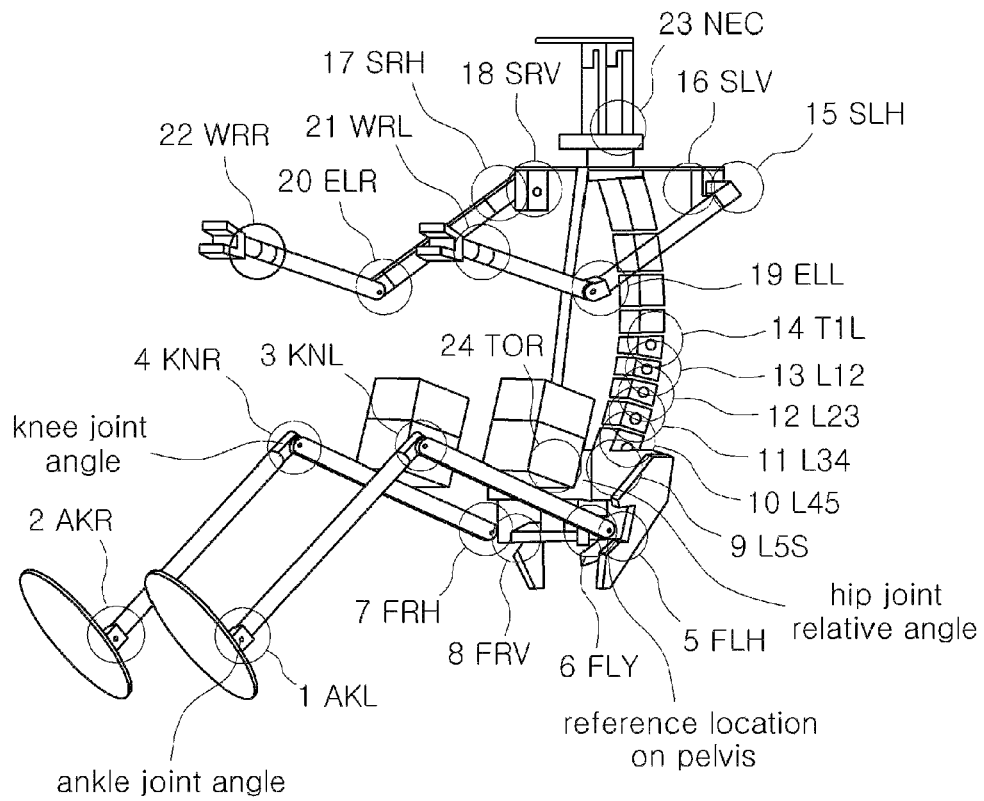

$$\begin{bmatrix} C(\frac{A2\pi}{180}) & 0 & -S(\frac{A2\pi}{180}) & 0 \\ 0 & 1 & 0 & 0 \\ S(\frac{A2\pi}{180}) & 0 & C(\frac{A2\pi}{180}) & 0 \\ 0 & 0 & 0 & 1 \end{bmatrix} \begin{bmatrix} C(\frac{A1\pi}{180}) & -S(\frac{A1\pi}{180}) & 0 & 0 \\ S(\frac{A1\pi}{180}) & C(\frac{A1\pi}{180}) & 0 & 0 \\ 0 & 0 & 1 & 0 \\ 0 & 0 & 0 & 1 \end{bmatrix} \begin{bmatrix} 1 & 0 & 0 & 435.5 \\ 0 & 1 & 0 & 0 \\ 0 & 0 & 1 & 0 \\ 0 & 0 & 0 & 1 \end{bmatrix} = [M1]$$

$$\begin{bmatrix} C(\frac{A3\pi}{180}) & 0 & -S(\frac{A3\pi}{180}) & 0 \\ 0 & 1 & 0 & 0 \\ S(\frac{A3\pi}{180}) & 0 & C(\frac{A3\pi}{180}) & 0 \\ 0 & 0 & 0 & 1 \end{bmatrix} \begin{bmatrix} 1 & 0 & 0 & 0 \\ 0 & 1 & 0 & 0 \\ 0 & 0 & 1 & -358.5 \\ 0 & 0 & 0 & 1 \end{bmatrix} = [M2]$$

$$\begin{bmatrix} C(\frac{A4\pi}{180}) & 0 & -S(\frac{A4\pi}{180}) & 0 \\ 0 & 1 & 0 & 0 \\ S(\frac{A4\pi}{180}) & 0 & C(\frac{A4\pi}{180}) & 0 \\ 0 & 0 & 0 & 1 \end{bmatrix} \begin{bmatrix} 1 & 0 & 0 & -81 \\ 0 & 1 & 0 & 0 \\ 0 & 0 & 1 & -112.5 \\ 0 & 0 & 0 & 1 \end{bmatrix} = [M3]$$

$$[M1][M2][M3] = [M4] \begin{bmatrix} 0 \\ 105.5 \\ 0 \\ 1 \end{bmatrix} = \begin{bmatrix} x \\ y \\ z \\ 1 \end{bmatrix}$$

HUMAN DUMMY SYSTEM FOR EVALUATING COMFORT OF SEAT

CROSS-REFERENCE TO RELATED APPLICATION

The present application claims priority to Korean Patent Application Number 10-2007-0131013 filed Dec. 14, 2007, the entire contents of which application is incorporated herein for all purposes by this reference.

BACKGROUND OF THE INVENTION

1. Field of the Invention

The present invention relates generally to a human dummy system for evaluating the comfort of a seat. More particularly, the present invention relates to a human dummy system for evaluating the comfort of a seat that is used to discover a seat structure capable of maximizing the comfort of a human body seated on a seat.

2. Description of Related Art

With the development of vehicle technology, demands for technology capable of improving the comfort of the driver and passengers of a vehicle are increasing. In particular, in the case of long riding, whether the seat structure of a vehicle matches a driver or passenger's body structure is an important factor to determine riding comfort. Accordingly, in the manufacture of the seats of a vehicle, the prediction of the characteristics of the body structure of a passenger as well as the characteristics of a vehicle is one of the important processes.

A prior art apparatus for determining an optimal seat structure has used a method of putting a human dummy at a seat and separately measuring the variations of the human dummy.

FIG. 1 is a diagram showing a prior art human dummy for evaluating the comfort of a seat. Referring to FIG. 1, the prior art human dummy has the joint structure of a human body, and the parts thereof are connected by ball/socket joints.

Although the prior art human dummy is focused on the implementation of a configuration similar to that of an actual human body so as to evaluate the comfort of a seat, it has a problem in that it does not realize the variations of the human body and the dynamic mechanisms of joints, in practice.

Moreover, there is a problem in that it is difficult to accurately measure the locations or angles of respective joints attributable to the variations of a human body because there are no correlations between the mechanisms of the respective joints.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a human dummy system for evaluating the comfort of a seat, in which the joints of a human dummy requiring measurement are provided with sensor units and the mechanism of the respective joints is utilized, so that the variation of the human dummy is measured in real time and then the comfort of the seat is evaluated.

In an aspect of the present invention, a human dummy system for evaluating comfort of a seat, may include sensor units attached to respective joints of a human dummy and configured to detect angles of the respective joints, and/or a data processing unit configured to determine relative locations of respective joints on a basis of angles of adjacent joints and distances therebetween, and determine an absolute location of a specific joint from a reference location by using the relative locations of the respective joints and coordinate system transformation between the respective joints of the human dummy.

The distances between the adjacent joints may be stored in the date processing unit in advance.

The coordinate system transformation may be performed through homogeneous transformation matrix operations using one or more of a translation matrix and a rotation matrix.

The reference location may be an ankle joint.

The reference location may be a pelvis, wherein the reference location is a center between two hip joints.

The relative locations of the respective joints may be compensated by uniformly allocating error among coordinate points of respective joints.

The error may be determined by comparing coordinate values of the absolute locations of the target joint based on the reference location, the absolute locations acquired along at least two different routes connecting the reference location and the target joint in common, wherein the allocated error is determined by dividing difference in the coordinate values of absolute locations of the target joint in each route by number of coordinate points in one route.

One of the routes may directly connect the reference location and the target joint.

The one route for dividing the difference in the coordinate values of the absolute locations of the target joint in each route may not be the one route directly connecting the reference location and the target joint.

The human dummy system may further include one or more of a display unit for displaying the relative locations of the respective joints transmitted to the data processing unit, a data communication unit for converting the relative locations of the respective joints transmitted by the data processing unit into information in a communication data format, and sending the resulting information, and/or a data storage unit for recording the information transmitted by the data communication unit on a predetermined storage medium.

The data communication unit and the data storage unit may communicate with each other via a Bluetooth or RC-232C method.

The data communication unit may receive data stored in the data storage unit, converts the data into data in a predetermined form, and transmits the resulting data to the data processing unit.

The sensor units may be potentiometers for converting the angles into electric resistance.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 4 is a diagram showing an example of calculating the absolute location information of each joint of a human dummy, for example, absolute coordinate values, according to the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
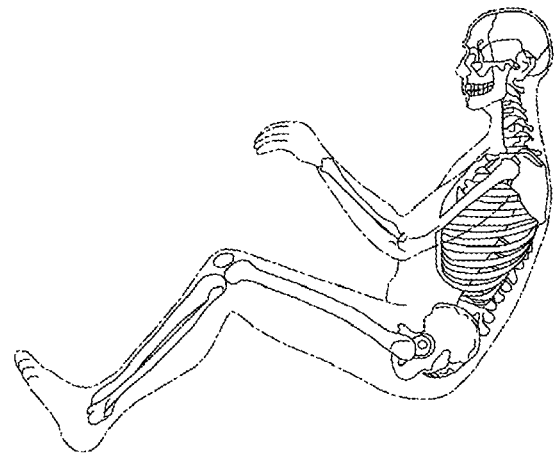
FIG. 1 is a diagram showing a prior art human dummy for evaluating the comfort of a seat.
Figure 2:
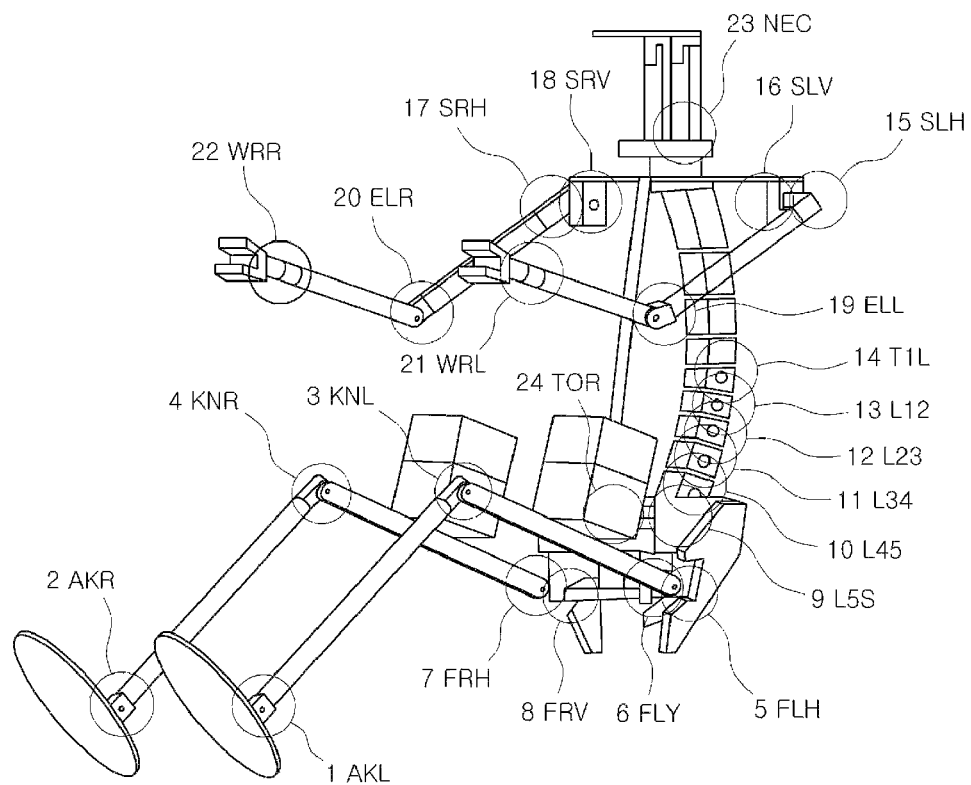
FIG. 2 is a diagram showing an exemplary human dummy for evaluating the comfort of a seat according to the present invention.

FIG. 2 is a diagram showing a human dummy for evaluating the comfort of a seat according to various embodiments of the present invention.

Referring to FIG. 2, the respective joints of a human dummy are provided with sensors. The joints of the human dummy correspond to the principal joints of an actual human body, and the human dummy is integrated through the joints. Here, the number of joints of the human dummy according to various embodiments of the present invention is, for example, a total of 23.

Figure 3:
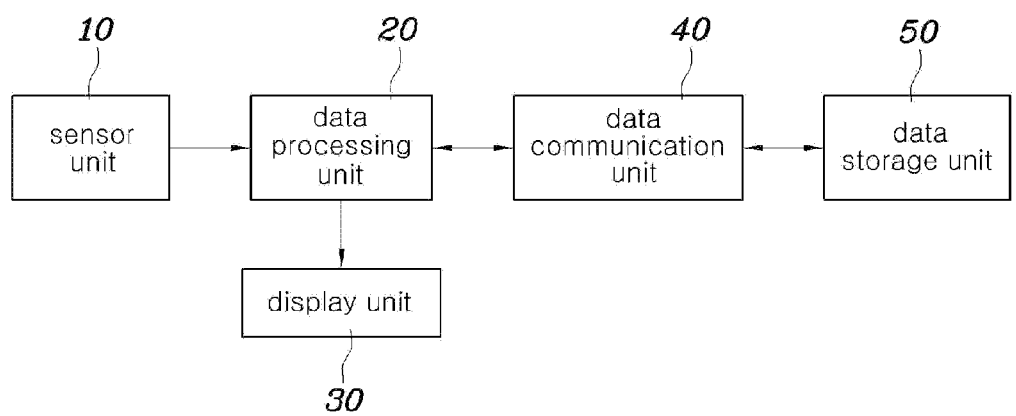
FIG. 3 is a diagram showing an exemplary human dummy system for evaluating the comfort of a seat according to the present invention.

FIG. 3 is a diagram showing a human dummy system for evaluating the comfort of a seat according to various embodiments of the present invention.

Referring to FIG. 3, the human dummy system for evaluating the comfort of a seat according to various embodiments of the present invention may include sensor units 10, a data processing unit 20, a display unit 30, a data communication unit 40, and a data storage unit 50.

The sensor units 10 are attached to the respective joints of the human dummy and measure the angles of the joints, as shown in FIG. 2. For example, the sensor units 10 may be potentiometers that convert angle values into electric resistance.

The data processing unit 20 calculates the relative locations of adjacent joints using the angle values of the respective joints measured by the sensor units 10 and information about distances between the respective joints previously stored, and calculates the absolute location of a specific joint using the relative locations and the coordinate system transformation between the joints of the human dummy.

Here, the relative location information may be coordinate values in a coordinate system that is formed around the adjacent joints of each joint, while the absolute location information may be coordinate values in a coordinate system that is formed around a specific joint. Furthermore, the specific joint, which is the reference of the absolute location information, may be the ankle joint or the hip joint. In particular, when the specific joint is the ankle joint, there is an advantage in that an absolute location can be calculated on the basis of the location at which the foot of the human dummy comes in contact with the pedal of a vehicle.

It is preferred that the absolute location of the specific joint, the distances of the respective joints or the distance between coordinate systems, which is used to create such absolute location information, be stored in the system in advance in the form of preset values.

FIG. 4 is a diagram showing an example of calculating the absolute location information of each joint of a human dummy, for example, absolute coordinate values, according to various embodiments of the present invention.

Referring to FIG. 4, the data processing unit 20 may calculate the absolute coordinate values of the ankle joint using information about the angle of the respective joints sent by the sensor units 10 and information about the distances between the respective joints. Here, absolute coordinate values refer to the coordinate values of a relevant joint on the assumption that the reference location of the hip joint is origin reference (0,0,0) in the rectangular coordinate system.

In detail, the absolute coordinate values of the ankle joint may be calculated using the angles of the hip joint (that is, a hip joint horizontal angle (A1) and a hip joint vertical angle (A2)), the angle of the knee joint (A3), and the angle of the ankle joint (A4). In greater detail, the absolute coordinate values of the ankle joint are calculated as the product of the matrices of the angle and distance information of respective joints based on the origin, i.e., hip joint. However, of the elements of each matrix, constant values are represented in the form of vectors to which values and directionality for the distances between the respective joints are assigned.

First to third determinants on the bottom side of FIG. 4 represent three coordinate system transformation processes. Furthermore, a fourth determinant represents a method of calculating final absolute coordinate values by multiplying respective coordinate system transformation equations together.

Figure 5:
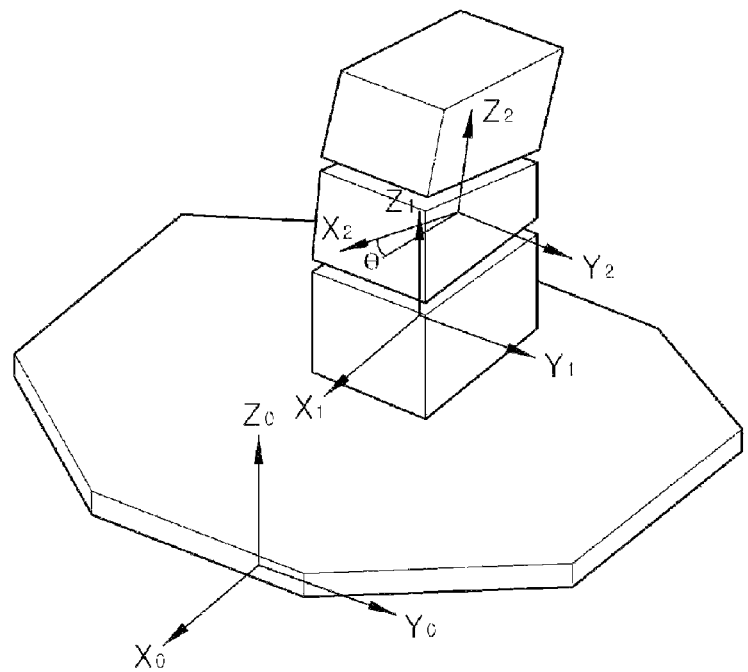
FIG. 5 is a diagram showing another example of calculating the absolute location information of each joint of a human dummy, for example, absolute coordinate values, according to the present invention.

FIG. 5 is a diagram showing another example of calculating the absolute location information of each joint of a human dummy, for example, absolute coordinate values, according to various embodiments of the present invention.

In order to transform relative coordinate values (x2, y2, z2) in a coordinate system T2 into absolute coordinate values in a reference coordinate system T0 when coordinates are set as shown in FIG. 5, the following homogeneous transformation matrix operation may be used.

In order to perform a homogeneous transformation matrix operation, the following Equation 1 may be used as a translation matrix between the reference coordinate system T0 to a coordinate system T1:

$$^0T_1 = \begin{bmatrix} 1 & 0 & 0 & x_0 \\ 0 & 1 & 0 & y_0 \\ 0 & 0 & 1 & z_0 \\ 0 & 0 & 0 & 1 \end{bmatrix} \quad (1)$$

Furthermore, the rotation of a coordinate system by $\theta$ together with translation is generated between the coordinate system $T_1$ and the coordinate system $T_2$. Accordingly, in order to perform coordinate system transformation from the coordinate system $T_1$ to the coordinate system $T_2$, a translation matrix and a rotation matrix must be multiplied together, as represented in the following Equation 2:

$$^1T_2 = \begin{bmatrix} \cos\theta & 0 & \sin\theta & 0 \\ 0 & 1 & 0 & 0 \\ -\sin\theta & 0 & \cos\theta & 0 \\ 0 & 0 & 0 & 1 \end{bmatrix} \begin{bmatrix} 1 & 0 & 0 & x_1 \\ 0 & 1 & 0 & y_1 \\ 0 & 0 & 1 & z_1 \\ 0 & 0 & 0 & 1 \end{bmatrix} \quad (2)$$
$$\text{(rotation matrix)} \quad \text{(translation matrix)}$$

Accordingly, in order to transform relative coordinate values (x2, y2, z2) in the coordinate system T2 into absolute coordinate values in the coordinate system T0, calculation is performed using the results of Equations 1 and 2, as shown in the following Equation 3:

$$^0T_2 = {}^0T_1 \times {}^1T_2 \times \begin{bmatrix} x_2 \\ y_2 \\ z_2 \\ 1 \end{bmatrix} \quad (3)$$

Through such homogeneous transformation matrix operations, the absolute locations of all joints of the human dummy, including the spine, are calculated on the basis of an origin set at the center between two hip joints. It will be apparent that absolute coordinate values may be calculated in the same manner using the ankle joint as an origin, that is, reference coordinates.

Figure 6:
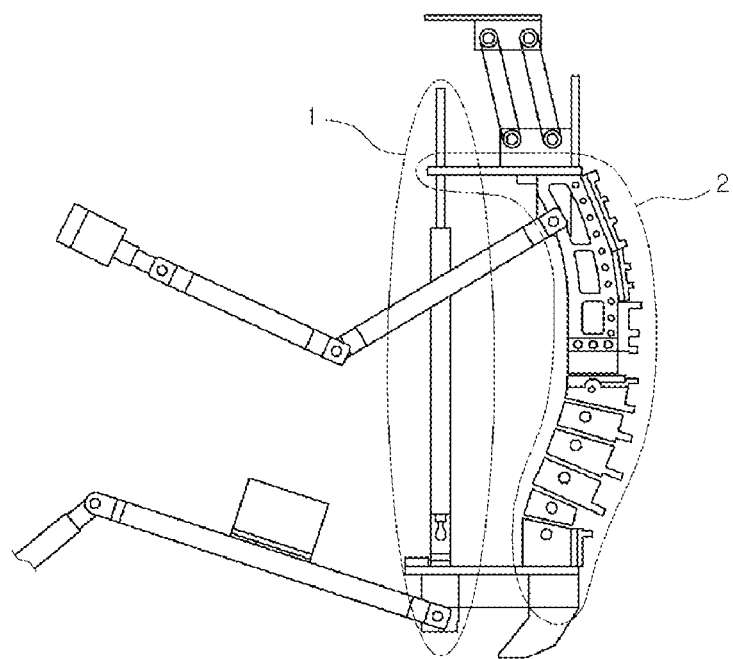
FIG. 6 is a diagram illustrating an exemplary method of compensating for error in the transformation of relative coordinate values into absolute coordinate values according to another embodiment of the present invention.

FIG. 6 is a diagram illustrating a method of compensating for error in the transformation of relative coordinate values into absolute coordinate values according to another embodiments of the present invention.

Referring to the side view of a human dummy shown in FIG. 6, it can be seen that in the measurement of a posture angle, a route 1 extending from a plate-type pelvis through a connection rod to the sternum and a route 2 extending through the stacked lumbar vertebrae to the sternum meet each other. When the error of the location of the sternum calculated using two routes is uniformly allocated among all the joints and compensation is performed, the accumulation of location measurement errors in each of the sensors can be prevented.

In order to obtain error values allocated among the measuring sensors of the respective joints, the human dummy is rested on a fastening device for setting a standard location and the zero points of all the sensors must be calibrated. For this purpose, the shoulder and plate-type pelvis of the human dummy are fastened to a dedicated rest and then angle data is measured along the route 1 and the route 2.

Error values can be determined by comparing absolute coordinate values calculated along the route 1 with coordinate values calculated along the route 2. The calculated error values are divided by the number of joints included in the route 2, and are uniformly allocated among the joints. The allocations resulting from the allocation of error among respective coordinate axes and an example of the results of error compensation are listed in the following Table 1: In this case, the hip joint is an origin reference and the sternum is a target joint to find absolute location.

TABLE 1

| | Position | Measured coordinates | | | Error allocation | | | Compensated coordinates | | |
|---|---|---|---|---|---|---|---|---|---|---|
| Route 1 | TOR | 0.000 | 0.000 | 20.000 | 0.000 | 0.000 | 0.000 | 0.000 | 0.000 | 20.000 |
| | STNM | −63.079 | 0.000 | 528.922 | 0.000 | 0.000 | 0.000 | −63.079 | 0.000 | 528.922 |
| Route 2 | L5S | −129.000 | 0.000 | 98.500 | 0.230 | 0.000 | 1.470 | −128.770 | 0.000 | 97.030 |
| | L45 | −134.900 | 0.000 | 131.510 | 0.470 | 0.000 | 2.950 | −134.470 | 0.000 | 128.560 |
| | L34 | −149.700 | 0.000 | 168.890 | 0.710 | 0.000 | 4.430 | −149.030 | 0.000 | 164.463 |
| | L23 | −165.500 | 0.000 | 206.750 | 0.950 | 0.000 | 5.910 | −164.628 | 0.000 | 200.843 |
| | L12 | −176.400 | 0.000 | 242.630 | 1.190 | 0.000 | 7.390 | −175.289 | 0.000 | 235.244 |
| | T1L | −184.900 | 0.000 | 278.420 | 1.430 | 0.000 | 8.870 | −183.939 | 0.000 | 269.551 |
| | STNM | −64.750 | 0.000 | 539.280 | −1.670 | 0.000 | 10.350 | −63.087 | 0.000 | 528.932 |
| | Error | −1.670 | 0.000 | 10.350 | | | | −0.007 | 0.000 | 0.009 |

Referring to Table 1, the final error of STNM is (−1.670, 0.000, 10.350). As the result of a process of uniformly allocating the error among seven coordinate points and performing location operations, it was found that the locations of the STNM calculated along the route 1 and the route 2 were consistent with each other within 10 and this location accuracy was maintained at the same level even though the posture of the human dummy was changed.

As a result, it was verified that the accuracy of the monitoring of the posture of the human dummy could be improved using a two route-based location coordinate error allocation method using the hip joint as an origin reference.

A method for compensating for error values based on coordinate values is a method of applying uniformly allocated angular error compensation values to the above-described Equation 3 along with compensation values. In a homogeneous transformation matrix operation process, error values may be allocated among respective joint location coordinates.

$$^eT_1 = \begin{bmatrix} 1 & 0 & 0 & e_x \\ 0 & 1 & 0 & e_y \\ 0 & 0 & 1 & e_z \\ 0 & 0 & 0 & 1 \end{bmatrix} \quad (4)$$

In Equation 4, a result obtained by comparing coordinate values calculated along different routes for the same location with each other and dividing the difference by the number of joints included in one route may be used as values ($e_x$, $e_y$, $e_z$), as described above. For example, values (−0.007, 0.000, 0.009), which are indicated as compensated error values in Table 1, may be substituted. Furthermore, according to the following Equation 5, in a homogeneous transformation matrix operation process, error values may be allocated by performing an operation including the result of Equation 4.

$$^0T_2 = {}^eT_0 \times {}^0T_1 \times {}^1T_2 \times \begin{bmatrix} x_2 \\ y_2 \\ z_2 \\ 1 \end{bmatrix} \quad (5)$$

That is, according to various embodiments, the relative location information can be compensated for by uniformly allocating error, which is calculated by comparing values of absolute location information acquired along at least two different routes from the origin reference, among joints included in each of the routes.

As described above, the data processing unit 20 may calculate the absolute coordinate values of a target joint by multiplying matrices including information about the angles of the respective joints and information about distances between the respective joints.

The display unit 30 displays the information about the locations of the respective joints transmitted to the data processing unit 20.

The data communication unit 40 transforms the information about the locations of the respective joints transmitted by the data processing unit 20 into information in a specific communication data format, and sends the information to an external storage device. Furthermore, the data storage unit 50 records the information transmitted by the data communication unit 40 on a certain storage medium. Alternatively, the data communication unit 40 may receive data recorded on the data storage unit 50, transform the data into data in a specific form, and sends the resulting data to the control unit 20.

The communication between the data communication unit 40 and the data storage unit 50 may be performed in either a wired or wireless manner, preferably using a Bluetooth, RC-232 or RC-232C method.

According to the above-described present invention, the locations of the joints of a human dummy and the variations in the locations of the joints can be measured in real time, and the comfort of a seat can be evaluated, so that there are advantages in which the manufacturing costs of a seat can be reduced and a complicated evaluation procedure for a seat can be simplified.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A human dummy system for evaluating comfort of a seat, comprising:
    sensor units attached to respective joints of a human dummy and configured to detect angles of the respective joints; and
    a data processing unit configured to determine relative locations of respective joints on a basis of angles of adjacent joints and distances therebetween, and determine an absolute location of a specific joint from a reference location by using the relative locations of the respective joints and coordinate system transformation between the respective joints of the human dummy;
    wherein the coordinate system transformation is performed through homogeneous transformation matrix operations using one or more of a translation matrix and a rotation matrix;
    wherein the relative locations of the respective joints are compensated by uniformly allocating error among coordinate points of respective joints; and
    wherein the error is determined by comparing coordinate values of the absolute locations of the target joint based on the reference location, the absolute locations acquired along at least two different routes connecting the reference location and the target joint in common.

2. The human dummy system as set forth in claim 1, wherein the distances between the adjacent joints are stored in the date processing unit in advance.

3. The human dummy system as set forth in claim 1, wherein the reference location is an ankle joint.

4. The human dummy system as set forth in claim 1, wherein the reference location is a pelvis.

5. The human dummy system as set forth in claim 4, wherein the reference location is a center between two hip joints.

6. The human dummy system as set forth in claim 1, wherein the allocated error is determined by dividing difference in the coordinate values of absolute locations of the target joint in each route by number of coordinate points in one route.

7. The human dummy system as set forth in claim 6, wherein one of the routes directly connects the reference location and the target joint.

8. The human dummy system as set forth in claim 7, wherein the one route for dividing the difference in the coordinate values of the absolute locations of the target joint in each route is not the one route directly connecting the reference location and the target joint.

9. The human dummy system as set forth in claim 1, further comprising one or more of:
    a display unit for displaying the relative locations of the respective joints transmitted to the data processing unit;
    a data communication unit for converting the relative locations of the respective joints transmitted by the data processing unit into information in a communication data format, and sending the resulting information; and
    a data storage unit for recording the information transmitted by the data communication unit on a predetermined storage medium.

10. The human dummy system as set forth in claim 9, wherein the data communication unit and the data storage unit communicate with each other via wireless or wire communication.

11. The human dummy system as set forth in claim 9, wherein the data communication unit receives data stored in the data storage unit, converts the data into data in a predetermined form, and transmits the resulting data to the data processing unit.

12. The human dummy system as set forth in claim 1, wherein the sensor units are potentiometers for converting the angles into electric resistance.

* * * * *